Oct. 5, 1965  R. W. HOHL  3,209,501
PARTITION PANEL ASSEMBLY
Filed Aug. 21, 1962  2 Sheets-Sheet 2
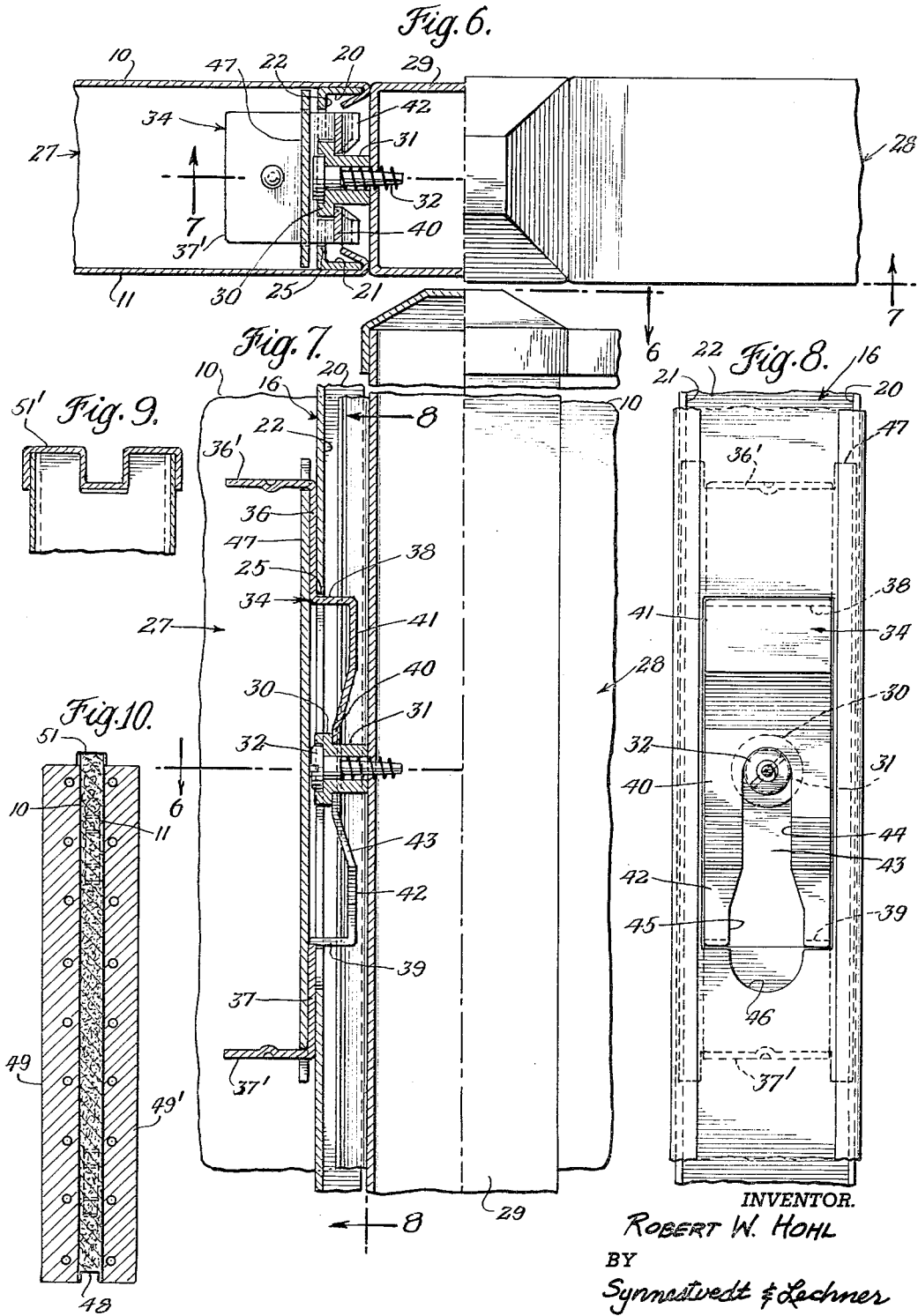
INVENTOR.
Robert W. Hohl
BY
Synnestvedt & Lechner
ATTORNEYS

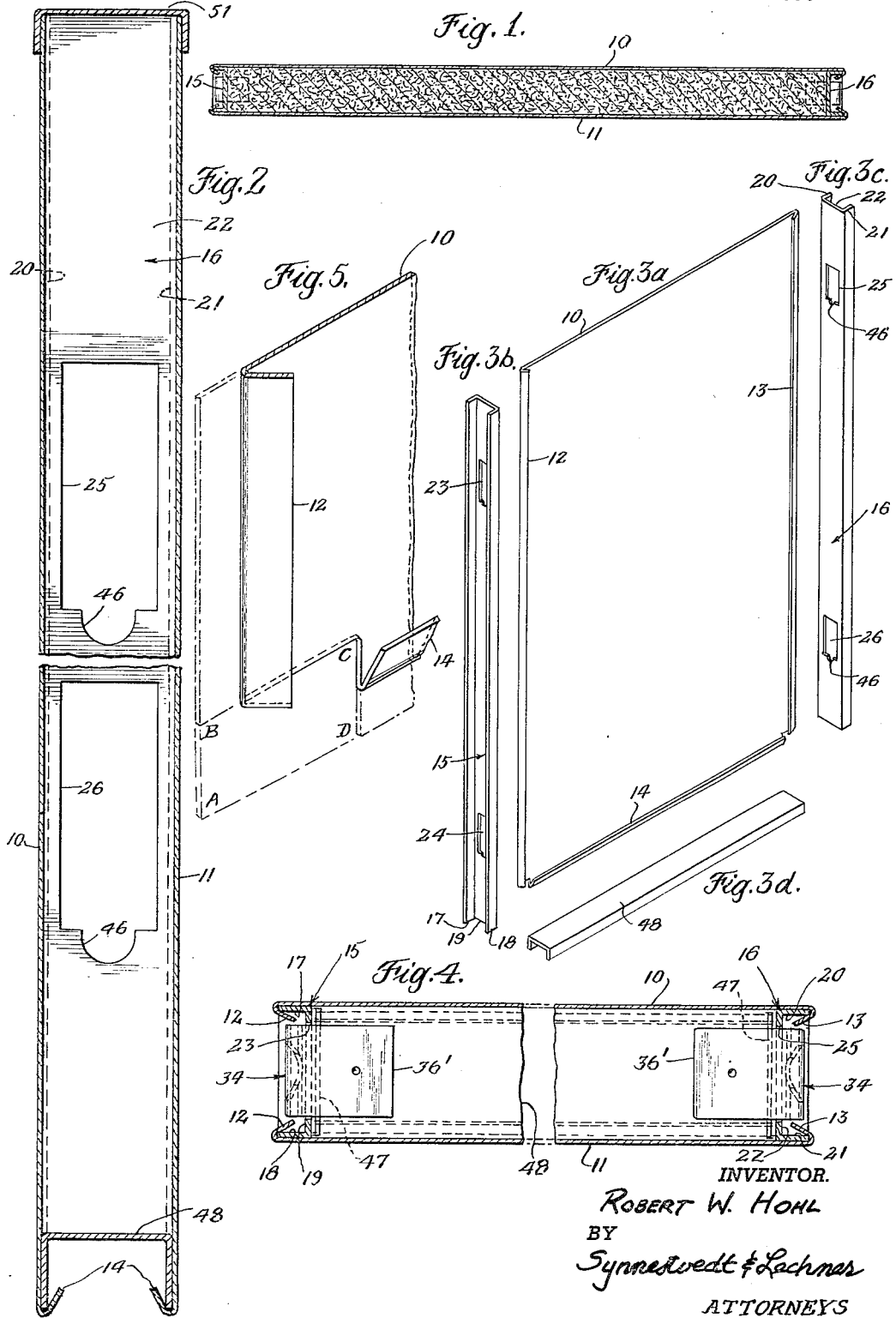

3,209,501
PARTITION PANEL ASSEMBLY
Robert W. Hohl, Glenside, Pa., assignor to Standard Pressed Steel Co., Jenkintown, Pa., a corporation of Pennsylvania
Filed Aug. 21, 1962, Ser. No. 218,382
4 Claims. (Cl. 52—309)

This invention relates to a panel unit which is especially useful in forming space dividers or partitions.

It is the object of this invention to provide a panel unit assembly that exhibits a maximum strength to weight ratio, that has a substantially uniform cross-sectional configuration, that is substantially uniformly rigid, that provides a substantially uniform flat surface that is durable, fire retardant, lends itself to mass production techniques and which can be used as the panel component in conventional panel-post partitioning assemblies.

These objects are accomplished in accordance with the present invention by a panel unit assembly which comprises a pair of laterally spaced rectangular side sheets, the inner faces of each of said sheets having a shallow channel extending along the bottom edge and along each of the vertical side edges and the bottom edge of the spaced side sheets so that opposite legs of a given spacing element will ride in the opposed channels which extend along the bottom and side edges of the side sheets, the void defined by the side sheets and spacing elements being filled with an expanded rigid plastic foam, and a cap member bridging the top edges of the side sheets.

The further construction details and advantages of panel units made in accordance with this invention will be brought out in the following description of a preferred embodiment of the invention.

Referring to the drawings:

FIG. 1 is a plan section of a completed panel;

FIG. 2 is an enlarged vertical section with a top cap and bottom channel in place and with the filler material omitted;

FIG. 3a is an isometric view of a panel skin or side sheet;

FIGS. 3b and 3c are isometric views of the side channels;

FIG. 3d is an isometric view of a bottom channel;

FIGS. 3a-3d are arranged as an exploded view;

FIG. 4 is a broken out plan section similar to FIG. 1 but of an enlarged scale; and without the rigid plastic foam filler;

FIG. 5 is a fragmentary isometric view of a lower corner portion of the panel plate of FIGURE 3a;

FIG. 6 is a sectional plan view of the panel and post construction as taken on the line 6—6 of FIG. 7;

FIG. 7 is a sectional elevational view as taken on the line 7—7 of FIG. 6;

FIG. 8 is an elevational view in the direction of the arrows 8—8 of FIG. 7;

FIG. 9 is a fragmentary sectional view illustrating the use of a glazing rail as an alternative form of cap;

FIG. 10 is a vertical section schematically illustrating a step in the fabrication of a panel.

As illustrated in FIG. 1, the panel unit includes two laterally spaced side sheets 10 and 11. The side sheets are generally rectangular and they can be of any desired dimensions to enable modular partition runs to be erected. For most purposes, it is preferred, to employ metal— especially sheet steel and aluminum—for the side sheets or skin. However, many other rigid materials in sheet form can be used for this purpose, e.g., since no welding is necessary to form the panel unit assembly, sheets of vinyl laminated to metal can be used in accordance with this invention.

As illustrated in FIGS. 3a and 5, the inner face of the side sheets are provided with shallow side and base channels 12, 13 and 14. Side channels 12 and 13 extend along the vertical side edges of the sheet and base channel 14 extends along the bottom edge of the sheet. The physical characteristics of the skin material will, to a large extent, determine how these channels are to be formed. However, with readily deformable materials, such as sheet steel, a simple edge bending operation can usually be employed, e.g., by merely bending the edges to form a V shaped groove. The channel need not be very deep; satisfactory results have been obtained with 24 gage material where the sheet edges were bent on a line about ¼ inch in from the outer edge of the flat uniformed sheet so as to form a V of about 30°. The dotted lines in FIG. 5 show the external configuration of side sheet 10 before the edge bending operation. The dimensions of the channel openings should be sufficiently wide and sufficiently deep to permit the channels to receive a leg of a U-shaped spacing element as will be described hereinafter.

Side spacing elements 15 and 16 can be seen in various figures. The side spacer elements are U-shaped members having a pair of legs interconnected or bridged by a web; spacer 15 having legs 17, 18 and web 19; spacer 16 having legs 20, 21 and web 22. Generally, it is preferred to employ spacing elements where the legs are at right angles to the web and which are bent on as short a radius as is convenient, however, other configurations which includes a pair of laterally spaced legs whose end portions are generally parallel, can also be employed.

The spacing elements employed at the sides of the panel unit preferably are provided with openings 23, 24, 25 and 26 adapted to receive locking inserts, or similar means for connecting the panel units to posts or column members which are secured to the floor or to a wall. Thus, as can be seen in the panel run shown in FIGS. 6 and 7, two panel units 27, 28 are connected to a square post 29 which is secured to the floor by a conventional base plate. One portion of the locking device is carried on the post and a second portion is carried by the panel unit.

The portion of the locking device secured to the post is a headed or button like member 30 having a shank portion 31 of lesser diameter than the head of the button. The button 30 is secured to the post by a metal screw 32 or other suitable fastening means at the desired height to cooperate with the part of the lock device carried by the panel and with the button shank 31 adjacent post 29 so as to offset the head from the side wall of the post.

Various retainer clip structures can be employed as the portion of the locking device carried by the panel. In general, it should have portions which project out from the exposed face of the side spacer element and the clip should be provided with a slotted portion of which the shank of the headed button will ride and exert pressure against the face of the headed button nearest the post when the panel and post are assembled into a run. By properly dimensioning the button offset and the outward projection and spring of the retainer clip, the pressure exerted by the clip against the under side of the button will draw the panel and post into a tight fitting engagement.

A preferred type of retainer clip 34 is illustrated in FIGS. 4, 6, 7 and 8. This clip is formed from a strip of springy metal having a width which is slightly less than the width of the opening 25 in the lateral spacing element 16 which is adapted to receive this portion of the locking device. The retainer clip insert is provided with a stepped portion adapted to project through the opening 25 in the web of the side spacer member. Strip portions 36, 37 prevent the locking insert from passing completely through the opening in the side spacer. The portion of the locking insert which extends between steps 38, 39 is provided with a reversely bent section whose central area 40 lies in a plane intermediate the plane formed by strip portions 36, 37 and the plane formed by strip portions 41, 42. A slotted opening 43 is formed in the strip and extends from mid section to about the point where step 39 joins strip section 37. The upper portion 44 of the slotted opening being of a width which will permit the shank 31 of the headed button to ride therein but of lesser width than the diameter of the button head portion. The lower portions 45 of the slotted opening have a width large enough to permit the headed button to pass easily through the opening when the panel unit is raised with relation to the post. To facilitate the passage of the headed button the opening 25 in the side spacer can also be notched 46 at the base to a width approximating that of lower portion 45 of slotted opening 43.

If desired, one or more ears can be attached to webs of the side spacing elements. These ears should project outward from the web in a direction generally opposite to that in which the legs extend. When the panel unit is assembled, these ears will project into the body of the expanded rigid plastic foam and act to grip the plastic filler. The ears can be separate members secured to the web; they can be stamped from the web material. As shown in the drawings, the ears can be integral portions of the retainer clip insert. Thus, as can best be seen in FIG. 7, the ends 36', 37' of the strip portions 36 and 37 are bent in a direction generally opposed to that of steps 38 and 39. These ears 36', 37' also serve to support a backer plate 47 for the locking strip insert. The backer plate serves to prevent the subsequently introduced plastic filler from being extruded out through the opening in the locking insert.

The bottom lateral spacer element 48 is also a U-shaped member, preferably having the same cross-sectional configuration and dimensions as the side wall spacers.

As can be seen in FIG. 5, the lower edge of the flat sheet from which the side skins are formed, are notched by cutting out a corner portion A, B, C, D before the channels 12, 13 and 14 are formed as this will simplify the bending operation. The length of the bottom spacer 48 preferably is such that when the panel unit is assembled; the ends of the side spacer elements 15, 16 will rest on the top of the outer web end portions of the bottom spacer.

To assemble a typical panel unit made in accordance with this invention, the side sheets are positioned generally parallel to one another and so that the side and base channels are presented toward one another. The locking retainer clips and backer plates are slipped into the openings of the side spacers; no fasteners are used as these members will subsequently be held firmly in position by the expansion of the plastic filler. The U-shaped side and bottom spacer elements are then slipped into place so that the legs of a given spacer are carried in the corresponding channels of the opposed side sheets, in the manner generally shown in the various figures of the drawings. The pre-assembled unit is then placed in a suitable mold, e.g., a pair of heated press plates 49, 49' bearing against the side sheets as illustrated in FIG. 10. The "pour-in-place" foaming resin system components (usually a liquid resin or resin former, a blowing agent, and a catalyst) in an uncured state is then introduced into the void defined by the side sheets and lateral spacing elements. The so-called "pour-in-place" foaming system for producing rigid, light-weight, gas expanded polyurethanes have been found to be suitable fillers for purposes of this invention.

After the plastic foam completely fills the void the cap is set in place. The cap is generally a "U-shaped" channel bridging the open top of the assembled skins and lateral spacers. In FIG. 2 a flat cap 51 is shown and FIG. 9 illustrates a cap 51' having a channel to receive the glass pane. The foam is then allowed to cure and set. The time of setting will vary from a few minutes to fifteen minutes depending on various factors such as panel thickness, curing temperatures, the foam formulation, etc. After the foam has set, the panel unit can be removed from the mold and is ready for use.

The mold press plates 49, 49' bear against the panel unit during curing with sufficient pressure to prevent the plastic foam from buckling or distorting the side sheets of the panel unit and as the foam sets, i.e., expands and rigidifies it will exert pressure against the lateral spacer elements and cause the side sheets, the cap, the spacer members, and the retainer clip inserts to become interlocked and form a firm and stiff panel unit. After the foaming filler has become rigidified, the outer skins of the resultant panel will be found to be flat and free of blemishes even though thin skins are employed.

This method of construction eliminates the need for welding on the panel and therefore, there will be no necessity of grinding and surface conditioning the surface weld marks normally formed when internal stiffeners are welded to the side sheets.

I claim:

1. A panel assembly comprising
   (1) a pair of laterally spaced rectangular side sheets,
   (2) each of said sheets having inwardly turned flanges defining shallow channels extending along the bottom edge and along the vertical side edges,
   (3) U-shaped lateral spacing elements positioned between the vertical side edges and the bottom edge of a given spaced side sheet so that opposite legs of the U-shaped elements extend outwardly and ride in the opposed channels which extend along the bottom and side edges of the side sheets,
   (4) said lateral spacing elements and said side sheets when assembled as aforesaid defining a void, capable of confining a liquid pour-in-place foaming resin system, said panel assembly having a core comprising an in situ expanded and rigidified foaming resin filling said void, said panel assembly being characterized in that the side sheets and lateral spacing elements are interlocked by the expansion and rigidification of the foaming resin system, and
   (5) a cap member bridging the top edges of the side sheets.

2. A panel assembly accoroding to claim 1 having a locking means for connecting said panel assembly to a vertical support by drawing the vertical edges of the side sheets into engagement with the support, said support being provided with a laterally offset headed fastening device, and said locking means comprising
   (1) a retainer clip positioned in an opening in the web of said side edge lateral spacing element,
   (2) said clip having strip portions bearing against the inner surface of portions of the side lateral spacing element above and below the opening and an ear projecting from said strip into the void between the side sheets,
   (3) said rigidified resin foam, said strip portions and said ear serving to maintain the positioning of the clip in the panel assembly,
   (4) said clip having a resilient portion projecting through the web opening and including a slot adapted to pass behind the head and receive the shank of said fastening device,
   (5) the resilient portion of the clip being normally spaced inwardly from the vertical edges of the side sheet a distance greater than the projecting shank portion of the fastening device, (6) so that said panel is drawn into tight fitting engagement with said support upon engagement of said clip and said fastening device.

3. A panel assembly according to claim 1 having a locking device adapted to connect the side edge of the panel unit to an upright member, said device being carried by and projecting outwardly from the outer face of a side lateral spacing element.

4. A panel assembly according to claim 3 wherein said locking device comprises a slotted retainer clip adapted to pass behind the head and receive the shank of a headed fastener which is secured to the upright member with its headed portion generally parallel to and offset from the face of the upright.

References Cited by the Examiner

UNITED STATES PATENTS

| 1,782,794 | 11/30 | Sadwith | 52—619 |
| 2,629,698 | 2/53 | Sterling | 260—2.5 |
| 2,753,642 | 7/56 | Sullivan | 264—45 X |
| 2,896,271 | 7/59 | Kloote et al. | 52—63 |
| 2,915,151 | 12/59 | Kekenak | 52—495 |

FOREIGN PATENTS 784,298 10/57 Great Britain.

FRANK L. ABBOTT, *Primary Examiner.*

RICHARD W. COOKE, *Examiner.*